Sept. 20, 1966 A. KLEIN 3,274,094
APPARATUS FOR THE CHLORINATION OF WATER
Filed Feb. 24, 1965 2 Sheets-Sheet 1
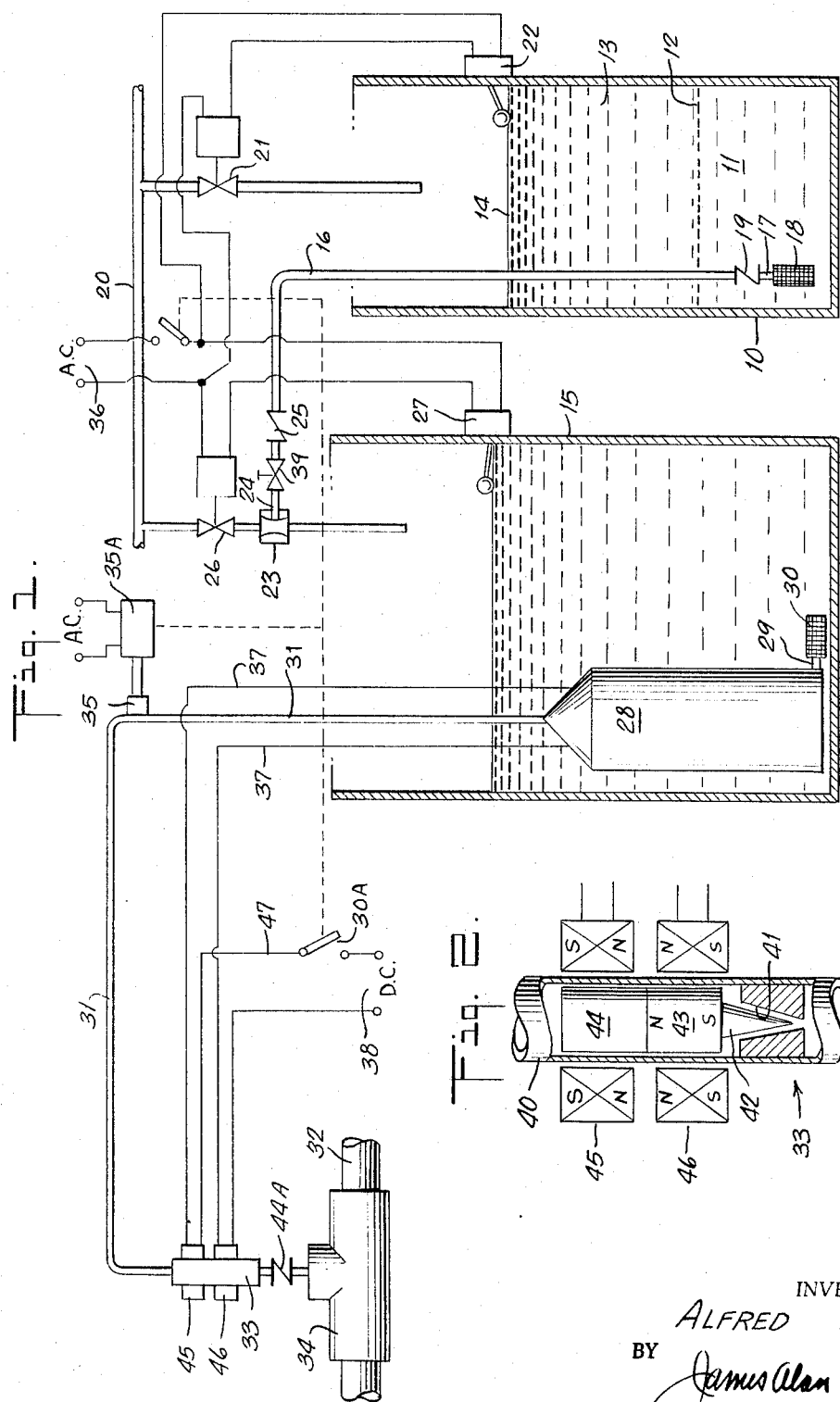
INVENTOR.
ALFRED KLEIN
BY James Alan Spady,
ATTORNEY

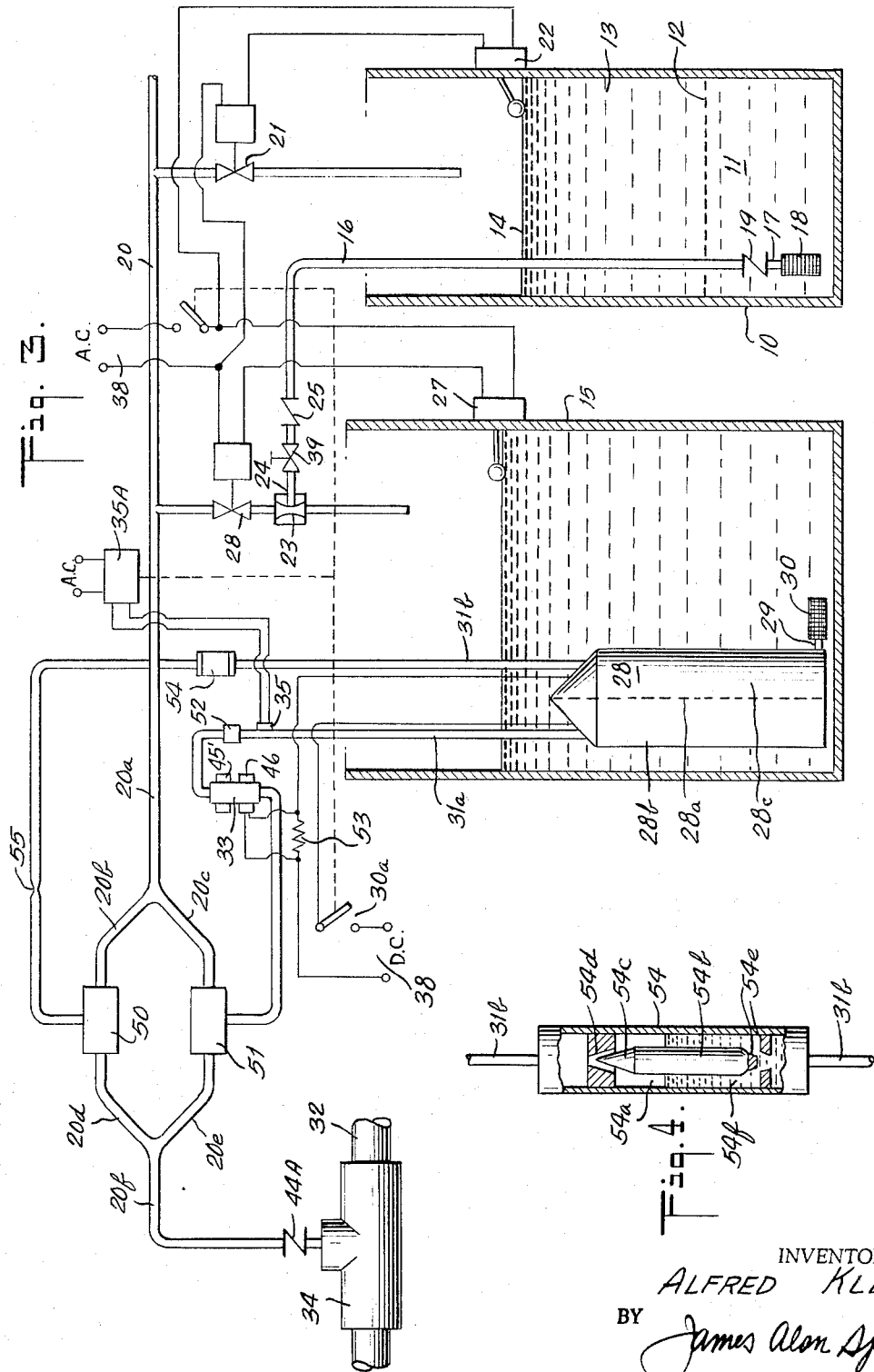

United States Patent Office 3,274,094
Patented Sept. 20, 1966

3,274,094
APPARATUS FOR THE CHLORINATION OF WATER
Alfred Klein, Brooklyn, N.Y., assignor, by mesne assignments, to Chemagnetics Controls, Inc., New York, N.Y., a corporation of New York
Filed Feb. 24, 1965, Ser. No. 434,823
The portion of the term of the patent subsequent to October 5, 1982, has been disclaimed
15 Claims. (Cl. 204—275)

This application is a continuation-in-part of the copending application Serial No. 104,447 filed April 20, 1961, now U.S. Patent No. 3,210,262.

This invention relates to the chlorination of a water supply, and more particularly relates to means for automatically producing a chlorinating substance and passing same into a water supply line so that the flow rate of the chlorinating substance added is relatively independent of the flow rate in said water supply line.

An object of this invention is to provide an improved apparatus for electrolyzing salt solutions in a continuous manner to produce a chlorinating substance and to continuously introduce such chlorinating substance into a water supply line.

Another object of this invention is to provide improved apparatus for maintaining a salt solution at a predetermined concentration; for continuously transferring said solution to electrolyzing means for continually converting the same to the corresponding hypochlorite of determined concentration; and for continuously passing the hypochlorite to a water supply line.

A further object of this invention is to provide in apparatus of the character described, improved regulating means and controls therefor whereby the volume rate of introduction of the chlorinating substance to the water supply line may be maintained at a substantially constant value despite fluctuations in the flow of water in the supply line; and whereby any rise in temperature in the electrolyzing means may be compensated by increase in the rate of flow of salt solution to the electrolyzing means.

A still further object of the invention is to provide an apparatus for the introduction of a chlorinating substance into a water supply line, which supply line maintains a constant volume body of water such as, e.g. a swimming pool, so that any selected setting for chlorination dosage of the body of water may be maintained despite changes in the flow rate in the water supply line due to progressive filter clogging or other reasons, and despite changes in either the ambient temperature or the temperature within the electrolyzing means itself.

Other objects of the invention will become more clear as the detailed description thereof proceeds hereinafter.

In the drawings:

FIGURE 1 is a diagrammatic showing of a first embodiment of an overall apparatus embodying the invention;

FIGURE 2 is a vertical section view showing internal details of a control valve forming a part of the apparatus of FIGURES 1 and 3;

FIGURE 3 is a diagrammatic showing of a second embodiment of an overall apparatus embodying the invention; and FIGURE 4 is a vertical section view of a valve assembly employed in the apparatus shown in FIGURE 3.

Briefly, the present invention includes a combination of means which cooperate to regulate the flow of chlorinating substance into a water supply line so as to achieve certain desired conditions. The term chlorinating substance, as used herein, will be defined as hypochlorite, chlorine, or mixtures thereof. The first major condition to be achieved, is the creation of compensation so as to maintain substantially constant the volume rate of flow of chlorinating substance into the main water supply line irrespective of the velocity changes of water flow therein. The second major condition to be achieved, is the creation of compensation for a rise in temperature in the electrolyzing chamber wherein the chlorinating substance is produced (whether the rise is an ambient rise or a rise due to the electrolysis).

It is helpful to introduce the principles of the invention which achieve the aforesaid conditions, by reference to a specific use, such as for example the use as a swimming pool chlorinator. However it should be borne in mind, that the invention is suitable for use with open systems such as water mains (wherein no recycling occurs) as well as with closed systems such as swimming pools (with recycling of filtered water). All swimming pool chlorinators are based on the fact that the chlorine demand of the pool (or the equivalent hypochlorite demand) will be constant for any given dosage setting, since the volume of water to be treated remains constant. That is to say, the volume of water in the pool plus the volume of water in the filter and pipes is constant. Nevertheless, the circulation rate of the filtered water varies and gradually drops near the end of a filter cycle, primarily due of course to the progressive clogging of the filter elements.

During a dosage period a minimum quantity of chlorine (or hypochlorite) is necessary to maintain a safe chlorine (or hypochlorite) level in the particular volume of water concerned. As aforesaid, the volume rate of flow of water through a filter system will decrease gradually until the filter elements become too clogged for the system to work efficiently, at which time the system must be shut down and the filter elements removed and replaced or cleaned. It is thus apparent that the volume rate of flow of water will vary with time; specifically the volume rate of flow will start at a relatively high rate, decrease slowly to a relatively low rate, and will then rather abruptly re-assume a relatively high rate, and so on in successive filter cycle periods. It is also important to keep in mind that there is no necessary correlation between the variations in the volume rate of flow of water through a filter system and the actual chlorine (or hypochlorite) consumption in the swimming pool itself; consequently no correlation exists between the water flow at a given time through the filter and the amount of chlorine (or hypochlorite) required to be added at that given time to maintain a preset minimum dosage level in the pool itself. For example, the period of time near the end of the filter cycle, i.e. the time before replacement or rejuvenation of the filter, when water may be circulated at perhaps one-half the rate at which it circulates at the beginning of a filter cycle, may very well coincide with the period of heaviest chlorine (or hypochlorite) consumption. The present invention provides an apparatus which is capable of self-compensation such that the various aforesaid changes in rate of flow in the filter system do not affect the rate of addition of chlorinating substance into the system; consequently it is now possible to set a dosage level for a swimming pool and to maintain that dosage level despite the changes with time in the flow rate characteristics of the filter system where the chlorinating substance is introduced. The invention of course, as aforesaid, has equal benefits with regard to introduction of the chlorinating substance into any water supply line where the volume rate of chlorinating substance added is desired to be substantially independent of the volume rate of flow of water in that supply line.

While the apparatus according to the invention maintains the flow of chlorinating substance relatively constant with respect to the flow rate of water in the supply line, that does not imply that it is not desirable to have the flow rate of chlorinating substance vary with other variables. Obviously when the dosage setting is varied the chlorinating substance flow rate will be deliberately increased or decreased relative to the change in dosage level. Also one of the features of the invention, the temperature compensating effect thereof, will vary the flow rate of chlorinating substance in direct response to temperature changes within the electrolyzing means, primarily as a mechanism for making the dosage level setting temperature dependent, since dosage level should be raised or lowered with ambient temperature. Thus when the ambient temperature changes, this is reflected in a change of flow rate of chlorinating substance, which is an automatic change in the dosage level setting. This effect also compensates for any internally caused rise in temperature within the electrolyzing means.

Because of the great availability and very low cost of common table salt (sodium chloride), it is preferred to use this material in the present invention. A dilute sodium chloride solution is produced, and is then electrolyzed to produce sodium hypochlorite in a first embodiment of the inventive apparatus, or sodium hydroxide solution and chlorine gas, separately, in a second embodiment. It is a feature of the invention that common table salt (sodium chloride) may be employed, so that the only short-term maintenance of the system that is required is the optional periodic change of the dosage level setting and the occasional addition of commonly available table salt. However, it is to be clearly understood that chloride salts other than sodium chloride may be employed with the present invention, so as to produce the corresponding hypochlorites, or chlorine and the corresponding hydroxide. Examples of such other salts are the alkali metal chlorides (the lithium, potassium, and rubidium chlorides), and the alkali metal earth chlorides (the calcium, barium, magnesium, and strontium chlorides). Sodium chloride (table salt) is by far the preferred material, for a variety of reasons, particularly because of economy. The recitation of the terms salt and salt solution in this specification will be understood to refer to any of the aforesaid chloride salts, and their aqueous solutions, and the recitation of the hypochloride and hydroxide will be understood to refer, respectively, to the hypochlorite and the hydroxide corresponding to the selected chloride salt. For example, sodium hypochlorite and sodium hydroxide correspond to sodium chloride.

Referring now to the figures, and especially to FIGURE 1, an apparatus forming a first embodiment of the invention comprises a tank 10 filled with salt 11 to a determined level 12, and water 13 to a predetermined level 14 to form within such tank 10 a saturated salt solution. Additional salt is periodically added to tank 10 to insure a saturated solution at all times.

Such salt solution is fed to a proportioning tank 15 by means of a conduit 16 which extends at one end 17 below the salt level 12 with an inlet strainer 18 of stainless steel at conduit end 17. A foot valve 19 is in conduit end portion 17, for the purpose later appearing.

The water level 14 is maintained within tank 10 by admitting water from a water line 20 by way of a solenoid controlled valve 21; the valve 21 in turn being regulated by suitable float operated switch 22.

The salt solution from tank 10 is fed to proportioning tank 15 for regulated dilution with water by suction means in the form of a venturi 23; the conduit 16 being connected to the suction side thereof as at 24, with an interposed check valve 25. Venturi 23 is operated by means of water from line 20 by way of a second solenoid operated valve 26 controlled by a float operated switch 27 on tank 15.

Within proportioning tank 15 is an electrolyzing chamber 28 formed of plastic or the like, and having interiorly thereof the conventional anodes and cathodes of suitable material, e.g. graphite, not shown. Chamber 28 has at its lower end an inlet 29 and inlet strainer 30. A conduit 31 extends upwardly from the upper end of chamber 28 for connection to a water supply line 32 which carries water to be treated with hypochlorite. Such connection is made through a valve generally indicated at 33 and a venturi 34, whereby the action of said venturi 34 is effective to draw the hypochlorite from chamber 28 by way of conduit 31 and valve 33.

A pressure responsive switch 35 in conduit 31 controls a switch 35A in circuit with the solenoid operated valves 21, 26 and a current supply 36, whereby water is supplied to tanks 10 and 15 only when water is flowing in supply line 32, and thus is effective to operate switch 35 and close switch 35A.

Direct current is supplied to electrolyzing chamber 28 for connection to the electrodes thereof, by way of lines 37 and a current source as at 38, through a contact 30A of switch 35A.

It will be apparent, that with the water flowing in supply line 32, solenoid valves 21, 26 are operated to pass water to tanks 10, 15 where the levels thereof are regulated by float operated switches 22, 27 respectively. As water flows into tank 15, simultaneously operating venturi 23, concentrated salt solution is drawn from tank 10 by way of conduit 16 and such solution is proportioned to the inflowing water from line 20. A needle valve 39 at the suction side of venturi 23 may be adjusted to vary the rate of flow of salt solution into tank 15. When such flow is stopped, as by operation of the float operated switch 27, back flow to tank 10 is prevented by check valve 25 and foot valve 19.

The salt solution in tank 15 enters chamber 28 by way of inlet 29 and rises in said chamber under the influence of venturi 34 which is connected to the upper end of chamber 28 by conduit 31. As said salt solution passes through chamber 28, portions thereof are electrolytically converted to the corresponding hypochlorite, the concentration thereof being regulated in accordance with the rate of flow of salt solution, the concentration of said solution and the voltage and amperage of the electrolyzing current.

The resultant hypochlorite solution is sucked from upstream at chamber 28 by means of a downstream pressure sink at venturi 34, by way of conduit 31, and thus passes into the water supply line 32.

It is noted that solenoid operated valve 26 is turned on to allow the water from line 20 to pass through venturi 23 at full pressure, to operate the same. Whenever salt solution in tank 15 reaches a predetermined level, valve 26 is closed through operation of switch 27 and is reopened when the solution drops below said level. In turn, as salt solution is drawn from tank 10, switch 22 operates to admit water by way of valve 21 to provide additional salt solution.

Since, as already explained, the rate of flow of water in supply line 32 may not be constant, and since as aforesaid it is desirable to maintain the volume rate of flow of hypochlorite through valve 33 substantially constant with respect to the flow rate in line 32, said valve 33 includes means for regulating the hypochlorite flow therethrough. Accordingly, as shown in FIGURE 2, valve 33 comprises an elongated housing 40 having a conical valve seat orifice 41 at the lower end thereof and a conical valve plunger 42 for moving toward and away from seat 41; however in its lower position the orifice is incompletely closed. Extending upwardly from valve 42 is a permanent magnet 43 and extending upwardly from magnet 43 is a hollow plastic portion 44 which provides a buoyant effect to the valve. A check valve 44A prevents back feed from main line 32 when the system is shut down.

At the exterior of housing 40 are located a pair of magnetizing coils 45, 46 arranged for movement toward and away from each other along said housing. Coils 45, 46 are arranged with similar poles in opposed relation and are connected in circuit with current source 38 by way of conductors 47 and 37. These coils serve to position magnet 23, and thus conical valve 42, at a null position depending on the electric current in coils 45, 46. This action of coils 45, 46 also provides a restorative force against which other forces on conical valve 42 act.

Water in line 32 moves at varying velocities depending on the demand. As a result of such velocity changes in line 32, the vacuum at valve 33 will vary in respect to a predetermined value. When the velocity in line 32 increases, thereby increasing the vacuum at said valve, the action of coils 45, 46 will be overcome by the pull down on valve plunger 42 thus decreasing the opening at seat orifice 41. When said velocity decreases relative to the predetermined value, then coils 45, 46 will cause the valve plunger 42 to move upwardly thus increasing the opening at seat orifice 41.

Thus, there is automatic compensation of the volume rate of flow of hypochlorite to maintain the predetermined value thereof substantially constant despite fluctuations in flow rate of the water flowing in line 32.

Also, since the electrolysis of the salt solution in chamber 28 is exothermic in character, an increase in temperature in said chamber increases the conductivity of the salt solution, which is in series circuit with coils 45, 46, thereby increasing the current flow to such coils with a consequent increase in magnetic field intensity. This in turn increases the orifice 41 of valve 33 and increases the volume rate of flow of salt solution into the interior of chamber 28, and thus cooling the same. Similarly, when the ambient temperature changes, the temperature of the reaction chamber changes also. This causes change in the flow of hypochlorite in direct relation thereto. The dosage level is thus automatically variable in the correct directions with increasing and decreasing ambient temperature.

It will be apparent that coils 45, 46 act in opposition to the force due to the vacuum produced by venturi 34. By moving the coils 45, 46 toward or away from each other, the resultant magnetic field may be regulated so as to adjust the compensating action of valve 33 for selected values of the volume rate of flow therethrough.

Referring now to FIGURE 3, there is shown therein a second embodiment of the inventive principles. The changes in the embodiment shown in FIGURE 3, with respect to the embodiment shown in FIGURE 1, reside principally in the manner of withdrawing the electrolyzed product from chamber 28 and conveying it to line 32. This involves a variation in the fluid circuit and the positioning therein of regulating valve 33, as well as certain other modifications. Like parts in the first and second embodiments are denoted by like reference characters.

In the first embodiment, already described, hypochlorite is produced in chamber 28 and withdrawn by a single conduit 31, to be introduced into supply line 32, subject to regulation by valve 33. This system is highly straightforward and is highly satisfactory for many classes of use. However the second embodiment has certain inherent advantages for many classes of use; and thus a choice is possible between the second embodiment at a somewhat greater equipment cost, and the first embodiment.

The main difference between the embodiments is that in the second embodiment, of FIGURE 3, the electrolyzed solution does not consist of salt and hypochlorite, but rather consists of a catholyte of salt and hydroxide in solution and an anolyte of salt and hydrochloric acid in solution. The hydroxide containing solution and evolved chlorine gas are combined externally of the electrolyzing chamber (i.e. out of communication with the salt bath) to form the hypochlorite. Several favorable results flow from this difference, as follows. First, while hypochlorite is the desired product, a hot electrolyzing chamber tends to produce a fraction consisting of chlorate, which is wastage and thus lowers overall efficiency. When however, the anolyte and catholyte are separated, as in the second embodiment, the electrolyzing chamber runs much cooler and consequently more efficiently. Second, a basic anolyte causes erosion of the anode, as when hypochlorite is produced as the electrolyzed product; but when the anolyte and catholyte are kept separate, as in the second embodiment, chlorine gas is formed at the anode and the resulting acidic anolyte prevents the aforesaid erosion. Third, comparison of an electrolyzing chamber wherein the liquid product is a mixture of salt solution and hypochlorite solution, with a chamber wherein the liquid product is a mixture of salt solution and hydroxide solution, shows that less weight of liquid need be drawn in the latter, in the weight proportion that the chlorine gas product bears to weight of the eventual hypochlorite product. Consequently, the salt efficiency of the electrolyzing chamber is raised when the anolyte and catholyte are kept separate, because less liquid is drawn for the same amount of (externally combined) hypochlorite, and therefore less salt is drawn out too.

In FIGURE 3, electrolyzing chamber 28 is shown with an internal partition 28a, shown in broken outline, which partition is fabricated from a semi-permeable material, such as asbestos, so as to afford electric charge communication between a portion 28b of the chamber and a portion 28c of the chamber, yet so as to retain the respective electrolytic ions and products in their respective portions. Such electrolytic chambers per se are known to the art. When portion 28b contains the cathode (not shown) the liquid in that portion comprises the catholyte which will include salt solution, and hydroxide solution as the electrolytic product. When portion 28c contains the anode (not shown) the liquid in that portion comprises the anolyte which will include salt solution, and dissolved and evolved chlorine gas as the electrolytic product. For example, when the salt solution is sodium chloride, the catholyte will in addition include sodium hydroxide, while the anolyte will include the aforesaid chlorine. Another inlet 29 (not shown) is arranged near the bottom of chamber 28, to supply fresh dilute salt solution to portion 28b of chamber 28.

A branch 20a of water line 20 supplies water flow to a pair of suction means 50 and 51 arranged in parallel, by means of branches 20b and 20c respectively. Suction means 50 and 51 may be, for example, aspirators of known construction. The downstream sides of suction means 50 and 51 communicate with branches 20d and 20e respectively, which meet to supply combining line 20f. Together, suction means 50 and 51, branches 20e and 20d, and line 20f, constitute a combining means for drawing, separately, electrolyzed product into means 50 and 51, and combining them into a single flow in line 20f with diluting water supplied by line 20a. While the parallel arrangement of means 50, 51, is preferred, primarily to separately dilute the two electrolytic products before combination, other arrangements may also be practiced.

It should be clearly understood throughout this specification, that water line 20 represents either a fresh water supply line, or a recycle line. Thus, in a closed system such as a swimming pool and associated filtration equipment, line 32 may represent the return line of filtered water to the pool, while line 20 may represent a derivative or diverted supply of filtered water, as e.g. in FIGURE 1 a branch of line 32, or as e.g. in FIGURE 3 a constant head of diverted water, e.g. a small reservoir diverted from line 32. Of course, even in a closed system such as a swimming pool, it may be desirable from time to time to add non-recycled water at line 20. In an open system, line 32 may represent e.g. a drinking water main, while line 20 may represent a local source of water, however derived.

A line 31a enters the catholyte portion 28b of chamber 28, and is adapted to draw the liquid therein (salt solution and hydroxide solution) from upstream at 28b through a filter 52 and to the inlet end of valve 33. The outlet end of valve 33 is connected to a downstream pressure sink at the suction side of suction means 51, thereby to supply liquid from chamber portion 28b to line 20e, 20f and thereby via another downstream pressure sink at 34, to line 32, all under the control of valve 33. The function of valve 33 in controlling this flow is the same as that described with regard to the first embodiment. The valve 33 is the same (although its settings will be changed for the new fluid circuit it is found in) except that, while a coil 46 is still employed, a permanent magnet 45' is employed together therewith, instead of a pair of coils 45, 46. In either embodiment it is only necessary to employ one electromagnet coil 46, and the other may be a permanent magnet. This is because the greater fineness of adjustment available with two electromagnets is not needed. Of course, in either embodiment, two electromagnets may be employed if desired. It has also been found advantageous to employ a voltage divider arrangement 53 to shunt a portion only of the electrolyzing current through the electromagnet, rather than the full current as shown in the first embodiment. This choice will be dictated by the electromagnet and the electrolyzing equipment chosen.

A line 31b enters the anolyte portion 28c. A check valve assembly 54 is interposed in line 31b so that only chlorine gas is conveyed by line 31b to the suction side of suction means 50. A constriction 55 in line 31b is so constructed, together with the characteristics of suction means 50 and 51, as to allow chlorine gas into line 20d at approximately the same rate at which hydroxide solution is supplied to line 20e. In this regard, it should be kept in mind, that these two products are necessarily produced at the same rate. The constriction 55 also serves, by causing back pressure, to assist check valve assembly 54 to suppress liquid from chamber portion 28c.

Shown in FIGURE 4 is the check valve assembly 54. A chamber 54a includes a flotatable plunger 54b having a conical upper end 54c shaped to close a conical seat 54d at the upper end of chamber 54a. Protuberances 54e at the bottom of chamber 54a prevent plunger 54b from sinking all the way down to the inlet orifice of line 31b. The operation of valve 54 is such that, any liquid 54f that may happen to be entrained with chlorine gas into chamber 54a, will not pass through conical seat 54d, because the float will close off the seat first. When closed, gas pressure in chamber 54a will force the liquid 54f back down to chamber 28, whereupon plunger 54b will be lowered to reopen seat 54d for the chlorine gas.

When the apparatus of FIGURE 3 is operated, the valve 33 controls the rate of flow of liquid electrolyzed product, i.e. the liquid hydroxide solution. This necessarily also controls the chlorine gas flow rate, since they are mutual products in chamber 28. The separate products are drawn by suction means 50, 51, and combined in line 20f, to be introduced into water supply line 32 under the vacuum of venturi 34. It does not matter if a little excess of either product, i.e. chlorine or hydroxide, is drawn into water supply line 32 at any given moment or period. This is because, firstly, the amounts involved are extremely small, and secondly, the system is self-rectifying. In point of fact, the match of rates between the chlorine gas and the hydroxide is very close at all times, but since they are necessarily produced in equal amounts, any possible imbalance is quickly corrected on the average.

In this regard, it should be pointed out that it is the chlorine that performs the chlorination in all cases. Hypochlorite systems are used instead of chlorine systems per se, because the former prevents the change in pH toward acidic which occurs in the latter. Consequently, the addition of excess chlorine (over hydroxide) is not critical except as to pH, and the addition of excess hydroxide (over chlorine) is not critical except, again, as to pH. As aforesaid, however, the two are closely coordinated in the nature of the apparatus. But because, in the second embodiment, chlorine gas and hydroxide are produced separately, it is possible to employ the present apparatus to use chlorine alone as the chlorinating substance, metering pH, and using the stored hydroxide product only when desired to correct a pH which has gone acidic beyond a predetermined level. It is thus possible to use the apparatus in a manner such that chlorine is the sole chlorinating substance, wherein the line 20e does not contribute to line 20f, so that the hydroxide flow is shunted off to a separate downstream pressure sink and not used, or not used immediately, with the chlorine for hypochlorination. The same degree of control of chlorination will be exercised, because, as aforesaid, the production of chlorine and hydroxide is at equal rates. Controlling the liquid hydroxide flow controls the chlorine flow, whether or not they are subsequently combined.

The valve 33 is shown in the second embodiment in the hydroxide, or liquid catholyte, line. This affords close control, and is preferred. However it is also possible, to arrange the valve 33 in local connection to line 32 via check valve 44A, as shown in FIGURE 1 for the first embodiment. In that case, the valve 33 would appear in line 20f (FIGURE 3) and no valve 33 would appear in line 31a.

While the invention has been described with reference to specific embodiments, no limitation thereto is implied. The embodiments are illustrative of the inventon, and various changes and rearrangements may be made therein, in addition to those pointed out above, without departing from the invention.

What is claimed is:

1. Apparatus for the introduction of hypochlorite into a water supply line so that the flow rate of hypochlorite added is relatively independent of the flow rate in said water supply line and including a chamber for holding a dilute salt bath, said apparatus comprising electrolyzing means immersed in said dilute salt bath and adapted to electrolyze said salt solution into separate constituents by passing electric current therethrough, one of said constituents constituting an electrolyzed liquid and the other of said constituents constituting electrolyzed chlorines; combining means for combining said electrolyzed liquid and said electrolyzed chlorine outside said electrolyzing chamber to form hypochlorite; and regulating means responsive to the flow rate in said water supply line to control said introduction of hypochlorite to said water supply line so as to maintain the flow rate thereof substantially independent of the flow rate in said water supply line, said regulating means comprising a valve having an orifice variable within a range of open values and means sensitive to flow rate in said supply line adapted to increase and decrease the cross-section of said orifice in inverse response to variation in said rate, said regulating means being interposed in the fluid circuit between said electrolyzing chamber and said water supply line.

2. Apparatus for the introduction of hypochlorite into a water supply line so that the flow rate of hypochlorite added is relatively independent of the flow rate in said water supply line and including a chamber for holding a dilute salt bath, said apparatus comprising electrolyzing means immersed in said dilute salt bath and adapted to electrolyze said salt solution into separate constituent by passing electric current therethrough, one of said constituents constituting an electrolyzed liquid and the other of said constituents constituting electrolyzed chlorine; combining means for combining said electrolyzed liquid and said electrolyzed chlorine out of communication with said electrolyzing means to form hypochlorite; and regulating means responsive to the flow rate in said water supply line to control said introduction of hypochlorite to said water supply line so as to maintain the flow rate thereof substantially independent of the flow rate in said water supply line, said regulating means comprising a valve having an orifice variable within a range of open values and means sensitive to flow rate in said supply line adapted to increase and decrease the cross-section of said orifice in inverse response to variation in said rate, said regulating means being interposed in the fluid circuit between said electrolyzing chamber and said water supply line; and means responsive to the amount of electric current flow through said electrolyzing means by increasing and decreasing said orifice cross-sectional area with increasing and decreasing electric current respectively.

3. Apparatus for the introduction of hypochlorite into a water supply line so that the flow rate of hypochlorite added is relatively independent of the flow rate in said water supply line and including a source of saturated salt solution and a chamber for holding a dilute salt bath, said apparatus comprising electrolyzing means immersed in said dilute salt bath and adapted to electrolyze said salt solution into separate constituents by passing electric current therethrough, one of said constituents constituting an electrolyzed liquid and the other of said constituents constituting electrolyzed chlorine gas; means for transferring regulated amounts of said saturated salt solution from said source in response to diluting water flow so as to mix therewith to supply said dilute salt bath; combining means for combining said electrolyzed liquid product and said electrolyzed chlorine gas product out of communication with said electrolyzing chamber to form hypochlorite; and regulating means responsive to the flow rate in said water supply line to control said introduction of hypochlorite to said water supply line so as to maintain the flow rate thereof substantially independent of the flow rate in said water supply line, said regulating means comprising a valve having an orifice variable within a range of open values and means sensitive to flow rate in said supply line adapted to increase and decrease the cross-section of said orifice in inverse response to variation in said rate, said regulating means being interposed in the fluid circuit between said electrolyzing chamber and said water supply line; and means responsive to the amount of electric current flow through said electrolyzing means by increasing and decreasing said orifice cross-sectional area with increasing and decreasing electric current respectively.

4. Apparatus according to claim 1 wherein said regulating means is interposed in said fluid circuit at a point after said combining means, so that said regulating means operates upon said hypochlorite flow to said water supply line.

5. Apparatus according to claim 1 wherein said regulating means is interposed in said fluid circuit at a point before said combining means, so that said regulating means operates upon said electrolyzed liquid product flow to said combining means.

6. Apparatus for the introduction of sodium hypochlorite into a water supply line so that the flow rate of sodium hypochlorite added is relatively independent of the flow rate in said water supply line and including a source of saturated sodium chloride solution and a chamber for holding a dilute sodium chloride bath, said apparatus comprising electrolyzing means immersed in said dilute sodium chloride bath and adapted to convert sodium chloride solution, by passing electric current therethrough, into separate bodies of catholyte containing sodium hydroxide solution and anolyte including and evolving chlorine gas; combining means for combining said catholyte containing sodium hydroxide solution and said chlorine gas, separate from the dilute sodium chloride bath about said electrolyzing means, so as to form a sodium hypochlorite containing solution; means for transferring regulated amounts of said saturated sodium chloride solution from said source in response to diluting water flow so as to mix therewith to supply said dilute sodium chloride bath; and regulating means responsive to the flow rate in said water supply line to control the introduction of said sodium hypochlorite containing solution so as to maintain a rate relatively independent of the flow rate in said supply line, said regulating means comprising a valve having an orifice variable within a range of open values and venturi means in said supply line having a suction side thereof communicating with said valve adapted to increase and decrease the cross-section of said orifice in inverse response to variation in the flow rate through said supply line, said regulating means being interposed in the fluid circuit between said electrolyzing means and said water supply line; and means responsive to the electric current flow in said electrolyzing means by increasing and decreasing said orifice cross-sectional area with increasing and decreasing electric current respectively.

7. Apparatus according to claim 6 wherein said means responsive to the amount of electric current flow comprises a member responsive to magnetic field and an electromagnet in circuit with said electrolyzing means for producing a magnetic field.

8. Apparatus according to claim 6 wherein said means responsive to flow rate in the supply line further comprises a valve plunger movable axially within said regulating means so as to increase and decrease said orfice and venturi means in said supply line having the suction side thereof communicating with said plunger so as, respectively, to attract and release said plunger upon, respectively, increased and decreased flow rate in said supply line so as, respectively, to decrease and increase said orifice; and wherein said means responsive to the amount of electric current flow comprises a magnetically sensitive body associated with said plunger and solenoid electromagnet means in circuit with said electrolyzing means and coaxially disposed about said plunger.

9. Apparatus for the introduction of sodium hypochlorite into a water supply line so that the flow rate of sodium hypochlorite added is relatively independent of the flow rate in said water supply line and including a tank for holding a dilute sodium chloride bath, said apparatus comprising electrolyzing means in said tank adapted to convert sodium chloride solution into sodium hydroxide containing solution and chlorine gas by passing electric current therethrough; combining means for combining said sodium hydroxide containing solution and said chlorine gas out of communication with said electrolyzing means so as to form a sodium hypochlorite containing solution; and regulating means adapted to control said introduction of sodium hypochlorite containing solution to said water supply line so as to maintain the rate thereof substantially independent of the flow rate in said supply line, said regulating means comprising a valve orifice, a valve plunger member movable within a range of axial positions relative to said orifice, and venturi means in said supply line having the suction side thereof arranged to exert a vacuum upon said plunger proportional to the flow rate in said supply line to move said plunger in inverse response to variation in the flow rate through said supply line so as to increase and decrease the effective area of said orifice with decrease and increase in said flow rate respectively, said regulating means being interposed in the fluid circuit between said electrolyzing means and said water supply line; and means sensitive to the amount of electric current flow in said electrolyzing means comprising a magnetically sensitive body associated with said plunger and a pair of magnet means, at least one of which comprises solenoid electromagnet means in the circuit of said electrolyzing means, said magnet means being mounted coaxially with said plunger and adapted to attract and repel said plunger axially in direct response to variation in said electric current so as to increase and decrease said orifice cross-sectional area in response to increasing and decreasing electric current respectively, the magnetic force of said magnet means acting to bias the plunger axially against forces other than change in said electric current.

10. Apparatus according to claim 9 wherein said magnet means comprises two portions having opposed poles movably holding said plunger axially at null thereinbetween against displacement therefrom.

11. Apparatus according to claim 10 wherein said magnet means are axially adjustable so as to allow change of said null point and thereby the charge rate of sodium hypochlorite into said supply line.

12. Apparatus according to claim 9 wherein said plunger and said orifice are mutually conical in outline, the closest approach of said plunger to said orifice thereby forming an annular flow passage considerably diminished in area from that of the furthest approach.

13. Apparatus according to claim 9 wherein said combining means comprises a pair of suction means arranged in parallel, a first of said suction means being adapted to draw said sodium hydroxide solution from said electrolyzing means, and a second of said suction means being adapted to draw said chlorine gas from said electrolyzing means; means connected to supply diluting water flow to each of said suction means; and connecting means connecting the downstream sides of said suction means and communicating with the suction side of said water supply line venturi means.

14. Apparatus according to claim 13 wherein said regulating means is interposed in the fluid circuit between said electrolyzing means and said first suction means.

15. Apparatus according to claim 13 wherein said regulating means is interposed in the fluid circuit between said connecting means and the suction side of said water supply line venturi means.

References Cited by the Examiner

UNITED STATES PATENTS

| | | | |
|---|---|---|---|
| 996,600 | 6/1911 | Stotts | 137—517 |
| 1,220,419 | 3/1917 | Hawley | 137—517 |
| 1,355,663 | 10/1920 | Greb | 137—517 |
| 1,723,382 | 8/1929 | Shutts | 137—517 |
| 2,285,802 | 6/1942 | Cubusac et al. | 137—517 |
| 2,536,813 | 1/1951 | Jones et al. | 251—65 |
| 2,873,236 | 2/1959 | Ferris | 204—95 |
| 3,129,162 | 4/1964 | Jones | 204—95 |
| 3,210,262 | 10/1965 | Klein | 204—232 |

JOHN H. MACK, *Primary Examiner.*

HOWARD S. WILLIAMS, *Examiner.*

T. H. TUNG, *Assistant Examiner.*